(No Model.) 2 Sheets—Sheet 2.
D. P. STEWART.
FEED WATER HEATER.
No. 297,644. Patented Apr. 29, 1884.
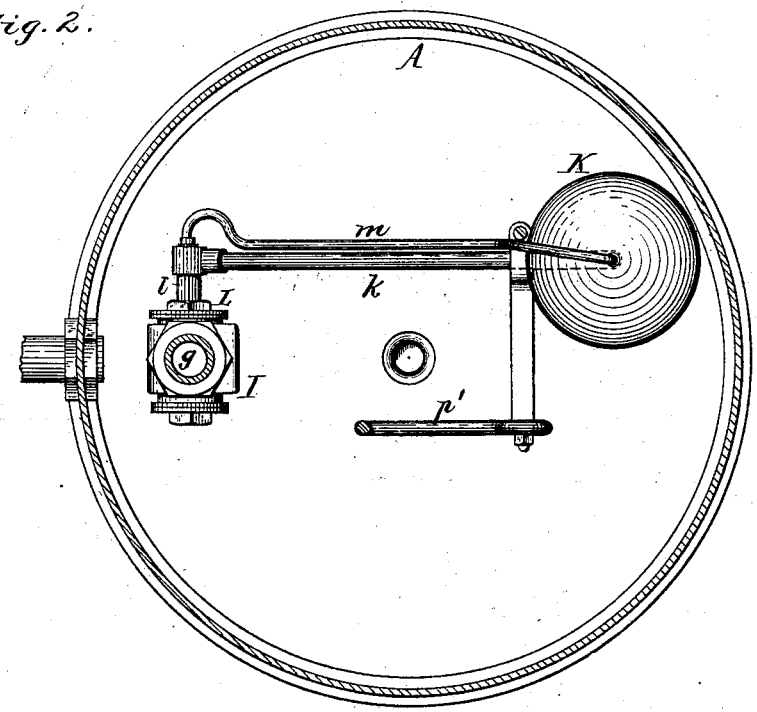
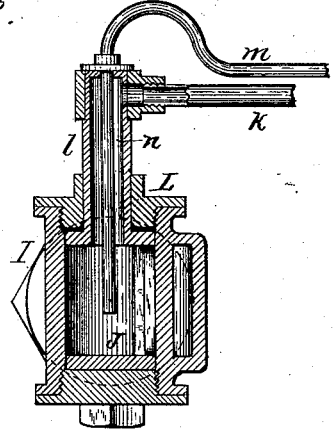
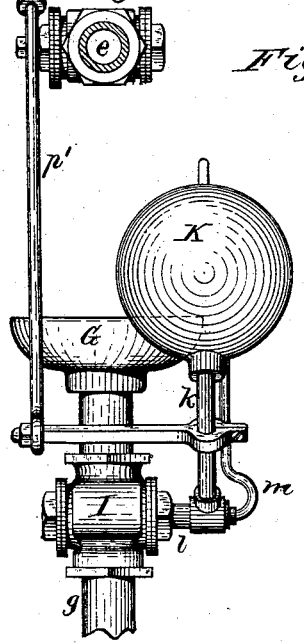
Witnesses:
Theo. L. Popp
Geo. E. Pitman
David P. Stewart, Inventor.
By Wilhelm & Bonner
Attorneys.

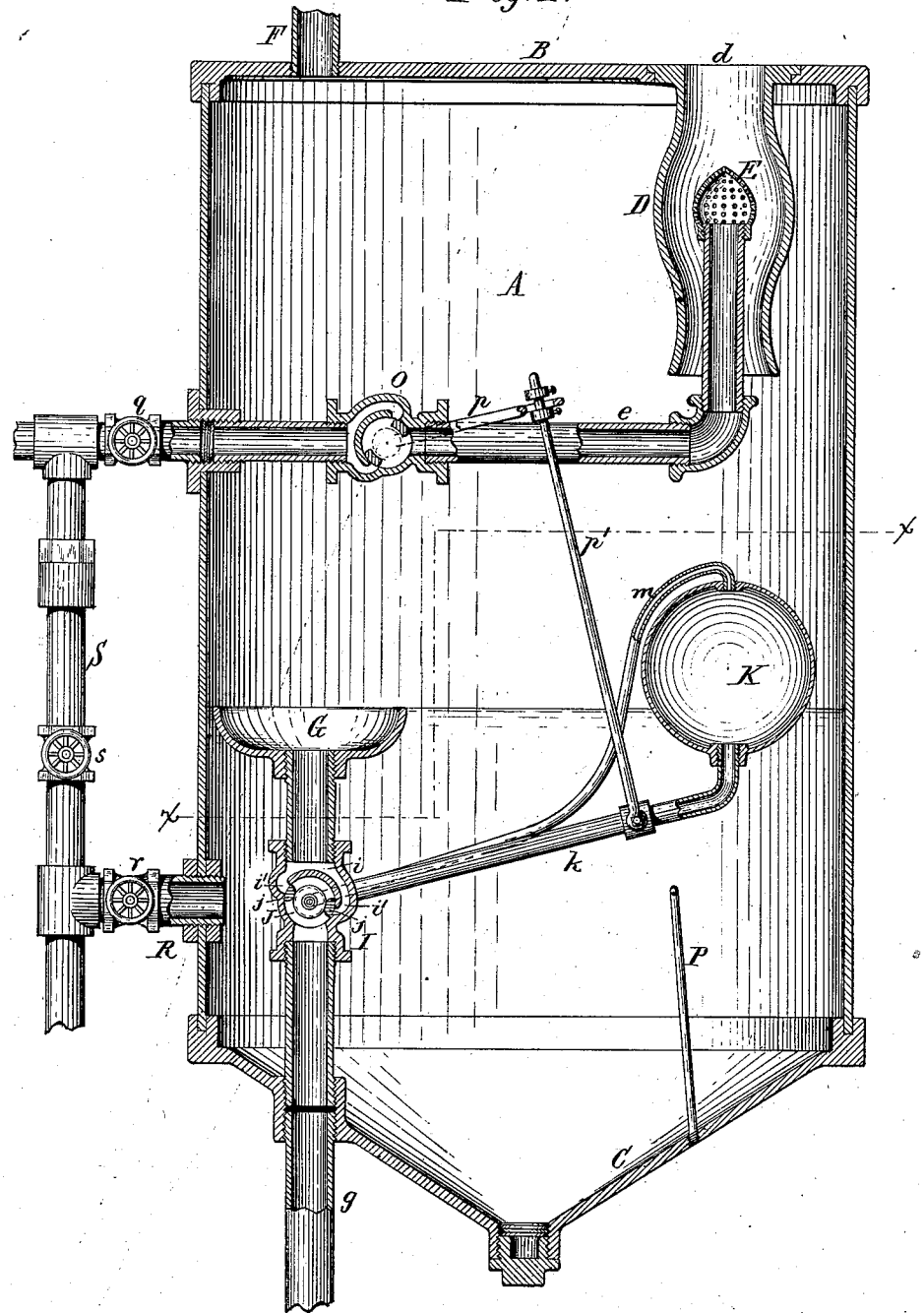

UNITED STATES PATENT OFFICE.

DAVID P. STEWART, OF BUFFALO, NEW YORK.

FEED-WATER HEATER.

SPECIFICATION forming part of Letters Patent No. 297,644, dated April 29, 1884.

Application filed August 30, 1883. (No model.)

*To all whom it may concern:*

Be it known that I, DAVID P. STEWART, of the city of Buffalo, in the county of Erie and State of New York, have invented new and useful Improvements in Feed-Water Heaters, of which the following is a specification.

This invention relates to an improvement in that class of feed-water heaters in which the water is introduced in a finely-divided state and heated by direct contact with the exhaust-steam.

The object of this invention is to regulate the water-supply and the overflow, to improve the operation of the float employed for regulating the same, and to provide means for regulating the temperature of the water passing through the feed-pump.

My invention consists, to these ends, of the improvements which will be hereinafter fully set forth, and pointed out in the claims.

In the accompanying drawings, consisting of two sheets, Figure 1 represents a sectional elevation of a feed-water heater provided with my improvements. Fig. 2 represents a horizontal section in line *x x*, Fig. 1. Fig. 3 represents a horizontal section, on an enlarged scale, of the overflow-faucet. Fig. 4 represents a fragmentary vertical sectional elevation.

Like letters of reference refer to like parts in the several figures.

A represents the casing or shell of the heater, which may be of cylindrical or other suitable form, and be constructed of iron, wood, or other suitable material.

B represents the head of the case, and C the bottom thereof.

*d* represents the pipe through which the exhaust-steam enters the apparatus, and D an enlarged mixing-chamber, which forms a continuation of the pipe *d*, and which depends from the cover B into the shell of the heater.

*e* represents the pipe through which the feed-water enters the apparatus, and E represents a spray-nozzle, which is secured to the end of the pipe *e*, within the chamber D, and which serves to distribute the water in a spray and bring the same in intimate contact with the exhaust-steam which enters through the pipe *d*, both the steam and water escaping from the mixing-chamber through the open lower end thereof into the shell A.

F represents the vapor-escape pipe, which is connected with the upper portion of the apparatus. All of these parts may be of any suitable and well-known construction.

*g* represents the overflow-pipe, secured in an upright position in the lower head or bottom C, and extending upwardly into the shell A.

G represents the scum-pan, which is secured to the upper end of the overflow-pipe.

I represents a valve or cock arranged in the overflow-pipe *g*, for controlling the flow of water through the same. This valve consists, preferably, of an upper chamber, *i*, communicating with the upper portion of the overflow-pipe, and having two ports, *i'*, leading to the lower portion of the overflow-pipe, and a hollow plug, J, having two faces, *j j*, which open or close the ports *i'*, the whole constituting a balanced valve of well-known construction.

K represents a float which regulates the position of the valve I, and *k* is the hollow stem whereby the float is connected with the plug J of the valve I. The stem *k* is connected with the lower portion of the float, so that any moisture which may condense in the float or leak into the same will drain off through the hollow stem *k* into the hollow plug J of the valve I, and thence into the waste-pipe *g*. The plug J is provided with a hollow shank, *l*, opening at its inner end into the cavity of the plug, and extending through a stuffing-box, L, in the side of the valve-casing. The lower end of the hollow stem *k* is secured to the hollow shank *l*, so that the bore of the stem *k* opens into the bore of the shank *l*, thereby establishing an open passage from the interior cavity of the float to the waste-pipe *g*.

*m* represents a vent-pipe, which extends from the upper portion of the float K to the interior cavity of the plug J. The lower end of this vent-pipe enters the outer end of the hollow shank *l*, and extends through the same into the cavity of the plug J, leaving between the outer side of the vent-pipe *m* and the inner side of the bore of the shank *l* an annular passage, *n*, as clearly represented in Fig. 3, through which the water passes from the hollow stem $k$ into the cavity of the plug J. This cavity communicates in all positions of the plug with the lower portion of the waste-pipe $g$, leading to the drain, and the air or vapor contained in the lower portion of the waste-pipe freely enters, therefore, the float through the vent-pipe $m$ in all positions of the float, thereby insuring the ready escape of the water from the float in all positions of the latter.

It has been found in practice that a float provided only with a drain-pipe, $k$, will from time to time become filled with water and sink, while a float having a vent-pipe, $m$, will keep itself free from water and operate properly at all times.

O represents a valve or cock arranged in the water-supply pipe $e$, within the shell of the heater, for regulating the quantity of water injected into the heater. The valve O is provided with an arm, $p$, which is connected with the stem of the float K by a rod $p'$. The valve O is preferably constructed with two ports and a plug having two faces, like the valve I, as hereinbefore described, and as represented in the drawings. When the water accumulates in the heater, the float rises and closes the valve O and opens the valve I, thereby reducing the supply of water and facilitating its escape through the overflow-pipe. When the water-level sinks below a predetermined height, the float sinks, opening the valve O and closing the valve I, whereby the water-supply is increased and the escape of the water retarded.

P represents a rest which prevents the float from sinking too far when the water is withdrawn from the heater.

$q$ represents a stop cock or valve arranged in the water-supply pipe $e$, outside of the heater.

R represents the pipe through which the hot water is conducted from the heater to the pump, and $r$ is a stop cock or valve arranged in said pipe outside of the heater.

S represents a branch pipe extending from the pipe $e$ to the pipe R, and $s$ is a stop cock or valve arranged in said branch pipe.

When the heater is working, the valves $q$ and $r$ are open and the valve $s$ is closed.

When it is desired to take the water-supply directly to the boiler, for filling the same, for instance, the valves $q$ and $r$ are closed and the valve $s$ is opened. When the feed-pump refuses to take the hot water from the heater, the temperature of the feed-water is readily reduced by opening the valve $s$, whereby the cold water is directly admitted to the pump. When the latter is working fairly, the valve $s$ is again closed.

I claim as my invention—

1. The combination, in a feed-water heater, of a water-inlet pipe and an overflow-pipe, each having a regulating cock or valve, and a float, whereby the positions of both of said cocks or valves are automatically adjusted, substantially as set forth.

2. The combination, with the overflow-pipe, of a regulating cock or valve having its hollow plug at all times in communication with the lower portion of the overflow-pipe, a float, and a hollow stem extending from the lower portion of the float to the hollow plug of the regulating-valve, substantially as set forth.

3. The combination, with an escape-pipe, of a cock or valve having its hollow plug in communication with the lower portion of the escape-pipe, a float and a drain-pipe, and a vent-pipe extending from opposite ends of the float to the hollow plug of said cock or valve, substantially as set forth.

4. The combination, with the overflow-pipe $g$, of a cock, I, having a hollow plug, J, and hollow shank $l$, a float having a hollow stem, $k$, opening into the shank $l$, and a vent-pipe, $m$, extending from the float through the hollow shank $l$ into the hollow plug J, substantially as set forth.

Witness my hand this 4th day of August, 1883.

DAVID P. STEWART.

Witnesses:
EDWARD WILHELM,
CHAS. F. GEYER.